March 12, 1940. SAMU-EL ISH-SHALOM 2,193,001
AIR FLOAT MIXER
Filed Sept. 21, 1939 8 Sheets-Sheet 7

INVENTOR.
SAMU-EL ISH-SHALOM
BY
ATTORNEY.

March 12, 1940.  SAMU-EL ISH-SHALOM  2,193,001
AIR FLOAT MIXER
Filed Sept. 21, 1939  8 Sheets—Sheet 8

FIG. 16.

INVENTOR.
SAMU-EL ISH-SHALOM

Patented Mar. 12, 1940

2,193,001

UNITED STATES PATENT OFFICE 2,193,001

AIR FLOAT MIXER

Samu-El Ish-Shalom, Brooklyn, N. Y.

Application September 21, 1939, Serial No. 295,854

9 Claims. (Cl. 259—4)

This invention relates to mixers, sterilizers and similar devices provided with a mixing chamber wherein a plurality of powdered materials such as are, for example, employed in the manufacture of cosmetics, delivered into one or more streams of air revolving at great speed and under great compressional energy.

It is one of the objects of the present invention to provide a new and improved means for mixing materials in a device having a mixing chamber of the character described, and it is intended to provide a mixing chamber in such a device with a plurality of air supply openings, which may be increased or decreased according to requirements and arranged in various ways or in groups to forward the powdered materials continuously around the mixing chamber to thoroughly mix the materials in a most efficient manner.

It is also one of the objects of the present invention to provide an arrangement whereby air is forced into the mixing chamber, first by one group of air inlets, then by a second group, and so on through a continuous cycle whereby the streams of air emanating from one group of inlets will forward the material to the next group and thus a complete cycle of mixing will occur, and after a predetermined period of time mixed material will be delivered through a separator to a collector.

It is also an object of this invention to provide a mixing chamber having a plurality of air inlets, and means by which air is forced first through some of said inlets and thereafter through other of said inlets, whereby materials delivered into the mixing chamber will be forwarded around the chamber through a predetermined path. It is also an object of the invention to provide a mixing chamber with means by which the material being mixed is forced by the air streams through a tortuous path whereby great efficiency in mixing operation is attained.

It is a further object of the invention that the improved apparatus be of simple construction and easy to clean and maintain in a sanitary condition, and wherein the various parts are conveniently adjustable to procure efficient operation and are readily accessible for inspection, cleaning and adjustment.

In the accompanying drawings, wherein several illustrative embodiments of the invention are shown.

Figure 1:
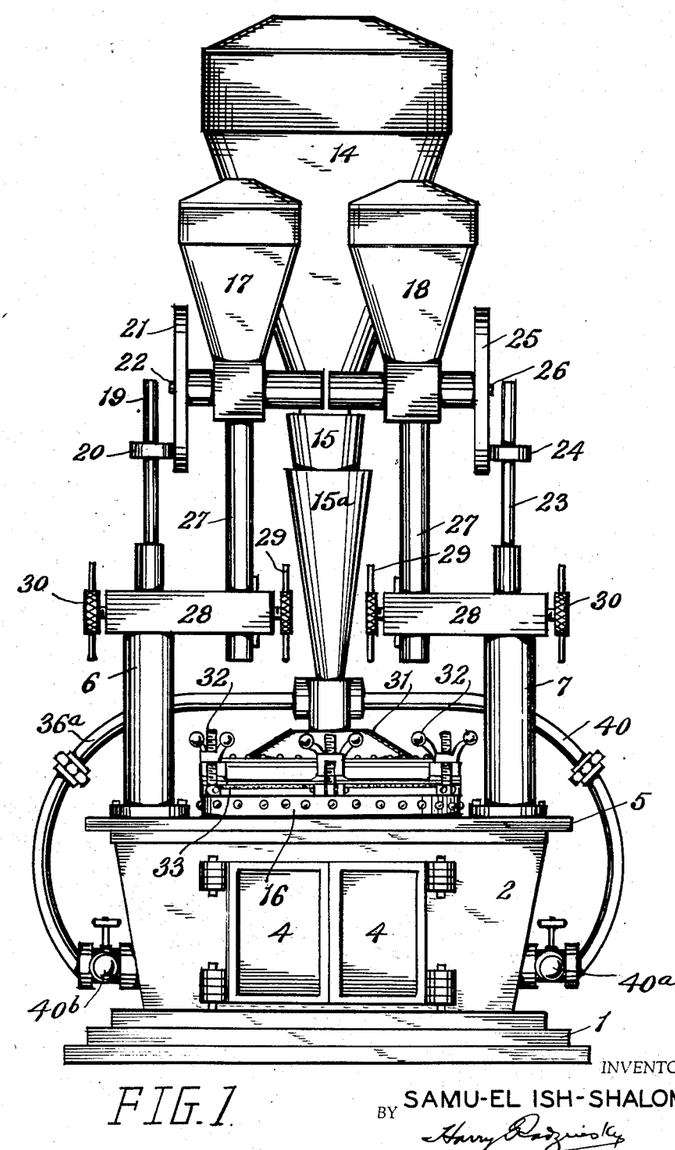
Fig. 1 is a front elevation of a machine constructed in accordance with the invention.
Figure 2:
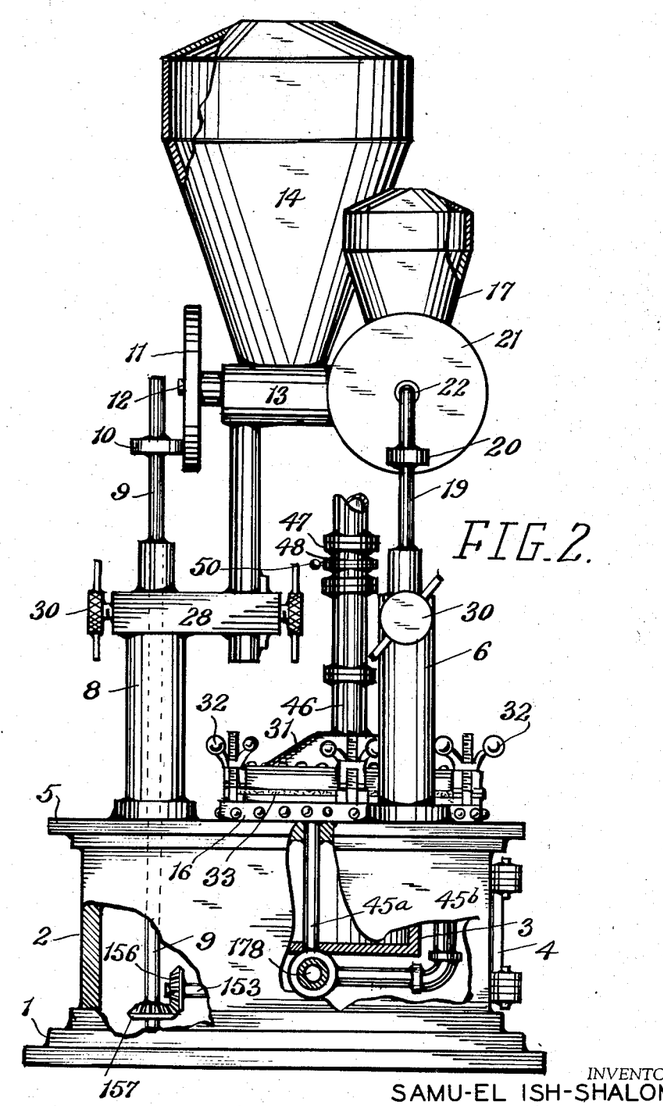
Fig. 2 is a side elevation of the same with the means for delivering the materials into the mixing chamber, as well as the air supply pipes being omitted to more clearly disclose construction.
Figure 3:
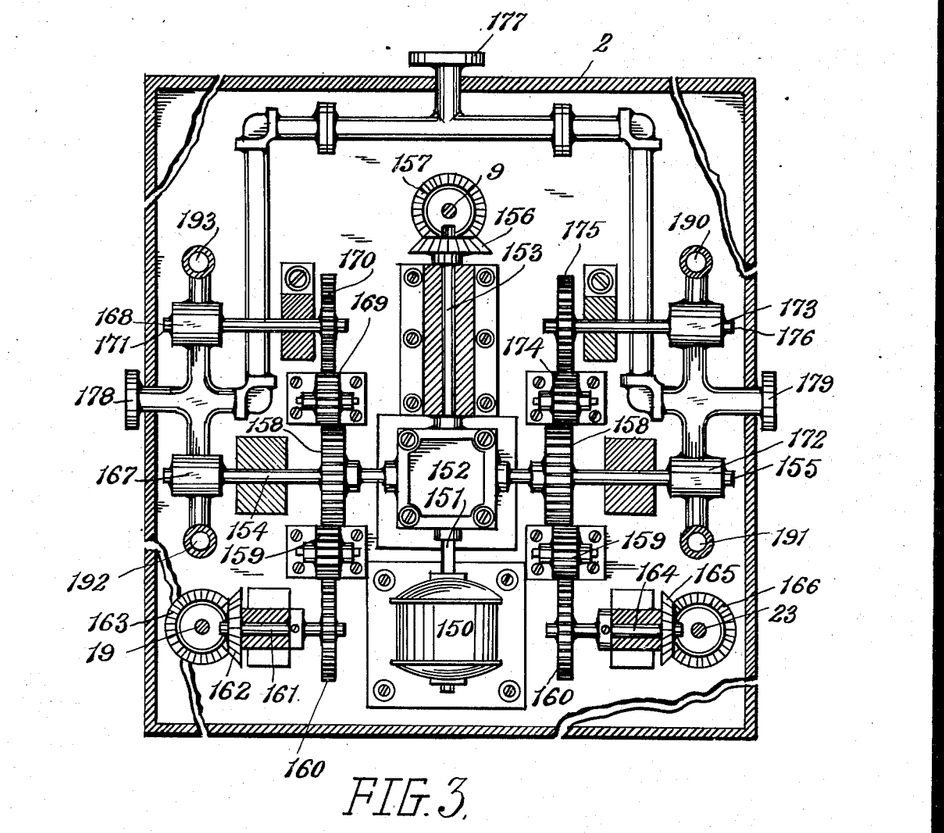
Fig. 3 is a plan view, with parts in section, of the means for operating the feed mechanism and valves for the air supply means.

With reference to the structure shown in Figs. 1 and 2, I indicates the base of the machine which is mounted upon the floor or upon any other suitable support. Secured upon the base and rising therefrom is a housing 2 in which the valve-operating mechanism and feed supply means shown in Fig. 3 is contained. Said housing also contains a collection receptacle 3 (Fig. 2) into which the mixed materials fall after having been properly mixed. Hinged doors 4 at the front of the machine provide access to the valve-operating means and to the collection receptacle for its removal and replacement.

Rising vertically from the top plate 5 of the housing 2 are three tubular standards or posts 6, 7 and 8. The post shown at 8 supports a vertically disposed rotatable shaft 9 on which is secured a disk 10 which frictionally engages and drives a disk 11 on a shaft 12 forming a part of a feed-supply means contained in casing 13 located at the bottom of main hopper 14. The feed supply mechanism forms no part of the present invention, and will accordingly not be herein described in detail, since examples of such feed supply means are shown in my copending applications, Serial Nos. 280,785 and 284,668. It is sufficient to herein state that when shaft 9 is rotated powdered material from hopper 14 will descend into the conical feed tube 15 from whence it will descend into the mixing chamber 16 to be agitated as herein set forth. Hoppers 17 and 18 are operated similarly to hopper 14. Hopper 17 is driven from shaft 19 located in tubular post 6, and carries disk 20 frictionally engaging the face of disk 21 secured on shaft 22. Similarly, shaft 23, within post 7, carries disk 24 which frictionally engages disk 25 on shaft 26 to operate the feed mechanism for hopper 18. Materials from hoppers 17 and 18 are delivered into feed tube 15a which delivers them into the mixing chamber. Compressed air may be employed to convey the streams of materials into the mixing chamber, through feed pipes 36a and 40, said pipes being preferably provided with manually operated valves 40a and 40b so that the flow through either of these valves may be controlled as special circumstances may require.

Each hopper is adjustably supported on a vertical post 27 extending through arm 28 and held therein by set screw 29, the arm being adjustably held on the tubular post 6, 7 or 8 by means of the set screw 30. Through the arrangement shown, the several hoppers may be raised or lowered as required, or they may be swung to one side for filling or cleaning whenever desired.

The mixing chamber, in which materials from the three hoppers 14, 17 and 18 are conveyed through delivery tubes 15 and 15a may be made in various shapes and of various constructions according to the materials to be mixed and according to different mixing requirements. The mixing chamber shown in Figs. 1, 2 and 4 will be first described. With reference to Figs. 1 and 2, it will be seen that the mixing chamber there shown is of cylindrical form and is supported upon the top plate 5 of housing 2. A cover 31 normally closes the top of the mixing chamber, the cover being removably clamped thereon by means of the clamps 32 or other suitable means. A gasket 33 is interposed between the top of the mixing chamber and the cover to insure an airtight joint therebetween.

The tubes 15 and 15a communicate with the interior of the mixing chamber by leading into the same either through the cover or through one of the side walls thereof and as previously explained, air under pressure entering into said tubes may be employed to force the materials down into the mixing chamber. In the form of mixing chamber shown in Fig. 4, it will be seen that near the outer face of the chamber is provided a plurality of spaced air inlet openings 35, these openings communicating with a source of air under pressure by means of pipe 45a, or any other suitable arrangement of piping or flexible tubing, whereby upon opening of one or more valves in a manner to be hereinafter pointed out, air under pressure will pass into the mixing chamber through the inlets 35 from which ports 36 extend to enter the mixing chamber. The interior of the chamber is formed with a tortuous passage produced by means of the oppositely disposed baffle plates or partitions 37, and each port 36 communicates with the tortuous passage by entry into the same at one side of each plate 37, while ports 38 near the inner portion of the mixing chamber communicate with the tortuous passage by entry therein at the opposite side of each plate 37. The ports 38 extend from a group of air inlet openings 39 which are connected to a source of air under pressure by means of the pipe 45b (Fig. 2) or by any other arrangement of piping or flexible tubing.

Figures 4, 5, 6:
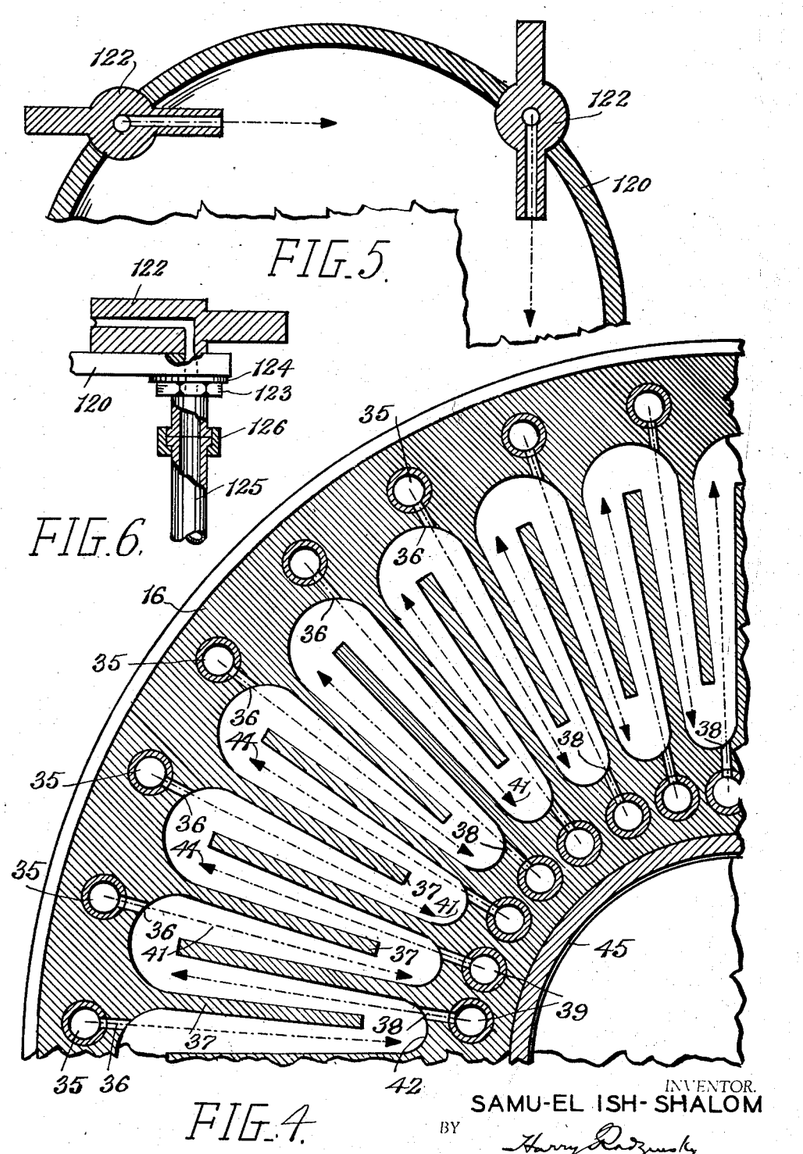
Fig. 4 is a horizontal sectional view through a portion of the mixing chamber.
Fig. 5 is a sectional view through a part of a mixing chamber, showing the employment of adjustable air inlets whereby the direction of air flow into the chamber may be regulated.
Fig. 6 is a side view, with parts in section of one of the adjustable air inlets disclosed in Fig. 5.

In the arrangement of the mixing chamber 10 shown in Fig. 4, the flow of air through the two groups of ports 36 and 38 is supplied alternately. That is to say, by means of one or more valves, the flow of air to inlets 35 is first opened so that the air streams will enter the tortuous passage through the ports 36. The streams of air emanating from ports 36 will strike the materials delivered into the passage and force the same in the direction of the arrows 41 to impinge against the end 42 of the passage. Then the flow of air through ports 36 is discontinued at the same time air is forced through the group of inlets 38 so that the materials forced adjacent to said inlets by the impulse of the streams from ports 36 will be moved in a direction toward inlets 36 or as shown by the arrows 44 and ready for the next air flow therefrom.

With this arrangement, it will be apparent that the materials will be moved rapidly through the tortuous passage in the mixing chamber and great efficiency in the mixing operation will be attained. In this construction of mixing chamber as well as in the others to be hereinafter described, a central opening 45 is provided through which the mixed material may drop down into the collection receptacle 3. An exhaust pipe or stack, shown at 46 in Fig. 2 but omitted from Fig. 1, allows the exhaust of the air, while the material mixed thereby descends into the collection receptacle.

In connection with such an exhaust stack, it may be found desirable to prevent the possible rise of some of the powdered materials out of the stack. For this purpose a separating screen, such as shown in detail in Fig. 13 might be employed. Secured in the stack is a screen holder 47 having spaced upper and lower guide plates 48 between which a fine mesh screen 49 is slidably mounted. An operating lever 50, for moving the screen into and out of operative position, is pivoted to the frame of the screen at 51, one end of the lever being pivoted at 52 to the end of an arm projecting from plates 48. It will be obvious that by manipulation of said lever 50 the screen may be drawn out of the path of air rising through the exhaust stack or it may be pushed into place so that the air will be caused to pass through the same to emanate from the stack, the screen preventing passage of the particles of powdered material, causing the same to drop down into the collection receptacle 3 located below the mixing chamber. By drawing out the screen from between the plates, as shown in Fig. 13 it may be easily cleaned and prevented from being clogged by an accumulation of the powdered material.

Figures 12, 13, 14, 15:
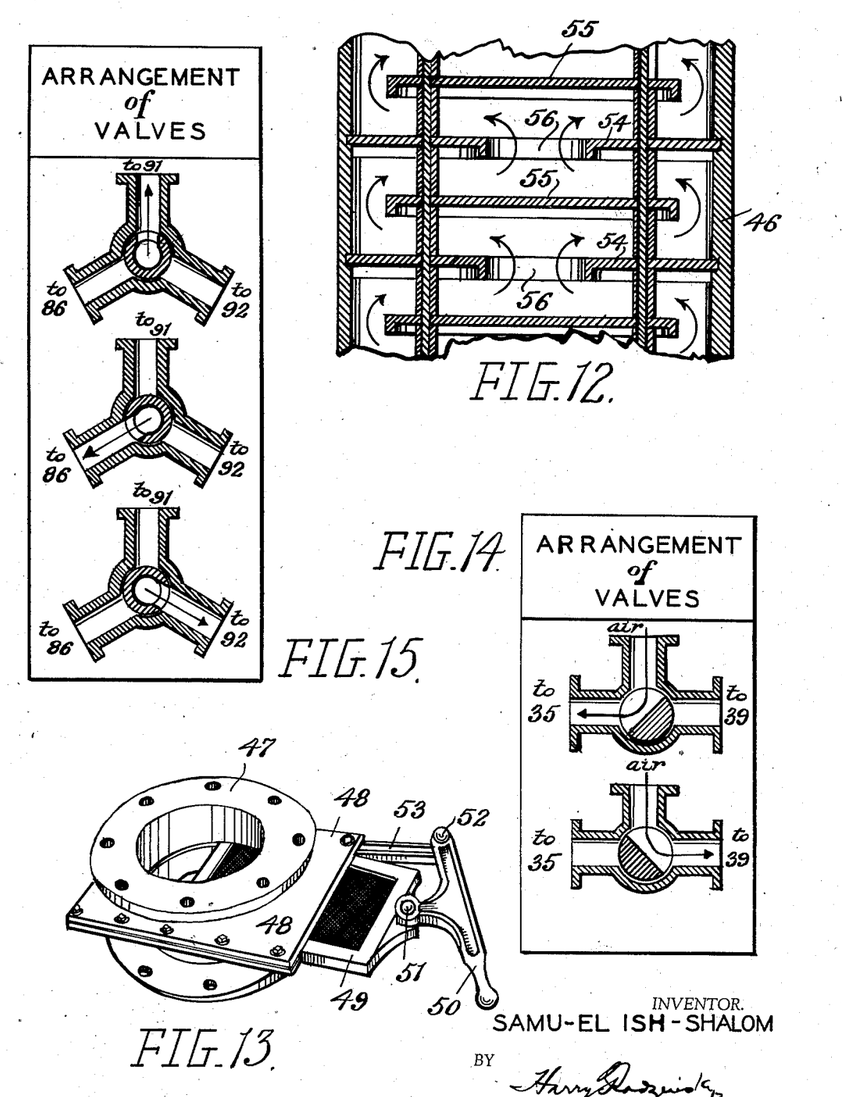
Fig. 12 is a vertical sectional view through an improved form of separator.
Fig. 13 is a perspective view of another form of separator wherein a movable separating screen is employed.
Fig. 14 is an illustrative chart diagrammatically illustrating the operation of the air valves when two groups of successively operating air streams are entered into the mixing chamber.
Fig. 15 is a similar chart showing the manner in which the air is supplied when three groups of successively operating air streams are entered into the mixing chamber.

As a substitute for the screen or as a supplemental separating means thereto, the arrangement shown in Fig. 12 may be employed. There, the exhaust stack 46 is provided with a plurality of baffle plates 54 and 55, those shown at 54 being provided with a central flanged aperture 56, while those shown at 55 are of less diameter than the interior of the stack whereby air may flow around the edges of the same after having passed through the apertures 56. The air flow is indicated by the arrows in Fig. 12 and the tortuous course which the same must follow causes separation of the powdered material from the air, the powdered material striking the baffle plates and descending, while the air rises and passes out of the stack.

Figure 9:
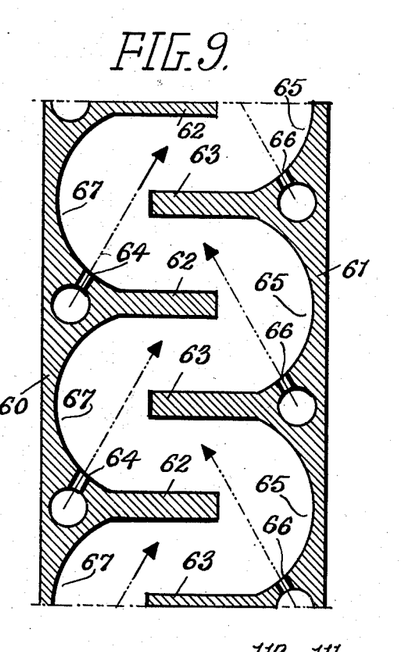

While the mixing chamber shown in Figs. 1, 2 and 4 is shown in substantially cylindrical shape, it may be made in various shapes to suit individual requirements, since in the present invention, the tortuous passage through which the materials being mixed is of importance rather than the external shape of the mixing chamber. For example, in Fig. 9 is shown a section of a mixing chamber in which two spaced walls 60 and 61 are employed. Wall 60 is formed with projecting baffle plates or partitions 62 which extend in a direction toward the inner face of the wall 61, while wall 61 is provided with similar spaced baffle plates or partitions 63 extending in an opposite direction or toward the inner face of the wall 60, the baffle plates on one of the walls being disposed between those on the other wall, whereby a tortuous passage is provided between the plates and walls similar to that shown in the structure of Fig. 4. Ports 64 in wall 60 enter angularly into the passage whereby air streams directed therethrough will flow angularly in a direction toward the end portions of the baffles 62 formed on wall 60, said air streams and the materials transported thereby impinging against the baffles 62 and then swirling into the curved portions 65 of the wall 61, located between the baffles 63 formed thereon. Wall 61 is provided with spaced ports 66 leading into the tortuous passage between the walls, said ports being disposed angularly as shown, and directing air streams angularly against the baffles 63 and toward the curved portions 67 located between the baffles 62.

As explained in connection with the structure of Fig. 4, it is desirable that the two groups of inlets shall emanate air streams alternately. That is to say, air will be admitted to ports 64 while the flow through ports 66 is shut off. Streams of air emanating from ports 64 will propel the materials into the curved portions 65 of the passage. Then the flow of air through ports 64 is discontinued and the flow through the ports 66 is begun. The air streams emanating from ports 66 will then swirl the materials into the curved portions 67 of the passage, and through this alternate operation of the two groups of ports the materials will be swirled progressively around the entire tortuous passage and thoroughly mixed.

Figure 10:
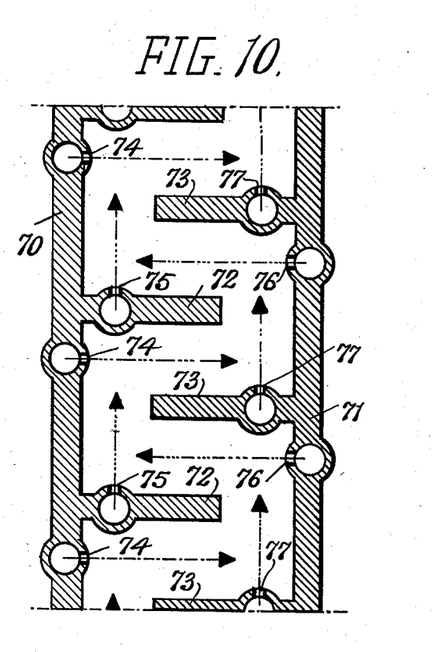

In Fig. 10 is disclosed an arrangement wherein four groups of ports are employed. There is shown two spaced wall portions 70 and 71 defining a mixing passage between them. The wall shown at 70 is formed with spaced baffle plates 72, while wall 71 is provided with the spaced baffle plates 73, the plates 72 being situated between the plates 73 as clearly shown. With this arrangement, a tortuous passage is provided between the walls in the manner similar to that shown in Fig. 9. Wall 70 is formed with a plurality of spaced inlet ports 74 through which air under pressure is forced to enter into the passage in a direction towards the opposite wall 71 as indicated by the arrows extending from the ports 74. The baffle plates 72 are also each provided with an inlet port 75 through which air streams are directed in a direction substantially at right angles to the streams directed from ports 74, and as indicated by the arrows leading from the ports 75. Wall 71 is provided with the inlet ports 76 directing air streams toward the inner face of the wall 70, and the baffle plates 73 on wall 71 are provided with inlet ports 77 directing air streams at right angles to those emanating from the ports 74 and 76 and substantially parallel to those emanating from the ports 75.

In the arrangement shown in Fig. 10 it is desirable that the four groups of inlet ports be operated successively. That is to say, air is first permitted to enter through the group of ports 74 to transport the materials toward the wall 71. Next air is forced through the inlet ports 77 so that the material is transported substantially parallel to wall 71. Next, air is caused to flow through the ports 76 to move the material toward the wall 70, and finally air permitted to flow through ports 75 moves the material longitudinally of the chamber. By alternate operation of the several groups of ports in the manner described it will be apparent that the materials will be rapidly swirled through the tortuous path disclosed in Fig. 10 and thus thoroughly mixed.

Figure 7:
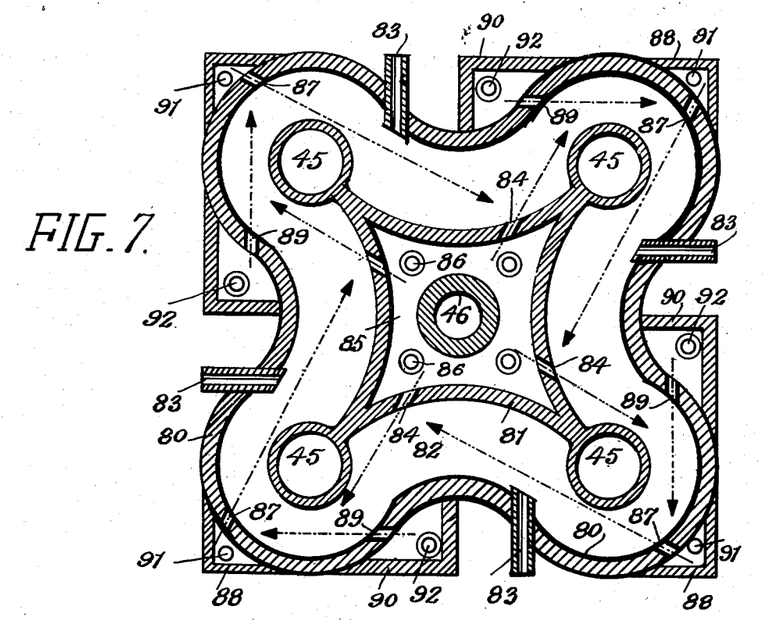
Figs. 7 to 11 inclusive are sectional views through various types of mixing chambers, which may be employed according to the invention.

In the structure shown in Fig. 7, the mixing chamber has an outer wall 80 and inner wall 81 spaced therefrom whereby a passage 82 is provided between the walls and in which the material to be mixed is swirled by the action of air streams. In this arrangement, while the materials to be mixed may enter the passage 82 through the top or cover of the mixing chamber, it may be found desirable to enter the materials into the passage through the side wall 80 or through the pipes 83, one or more of which may be used to permit entrance of the powdered materials into the passage 82. The inner wall 81 is provided with angular ports 84 establishing communication between the passage 82 and the chamber 85 surrounded by the inner wall 81. Air inlets 86 communicating with the chamber 85 deliver the air thereinto so that the air may pass out of the ports 84 in angularly directed streams in the manner indicated by the arrows leading from the ports 84. Outer wall 80 is provided with a plurality of angular ports 87 and 89, the portions of the mixing chamber in which said ports are provided being enclosed by the casings 88 and 90. Leading into the casings 88 are the air inlets 91 which deliver air under pressure for ejection through ports 87, while air inlets 92, leading into the casings 90 deliver air for ejection through ports 89. In the structure of Fig. 7 air is first projected through ports 89 and the streams emanating therefrom begin to swirl the materials around the passage 82 in the direction indicated by the arrows leading from ports 89. Then the flow of air to ports 89 is shut off and air flow to ports 87 begun so that the flow of air from said ports will swirl the materials as indicated by the arrows leading from ports 87. Next, the flow of air from ports 84 is begun while the flow from ports 87 is shut off, and after the flow from ports 84 is discontinued, flow from ports 89 is begun to resume the next cycle of operation. Through the successive operation of the three groups of ports described, the materials to be mixed are rapidly swirled around and around within the passage 82 until completely mixed.

Figure 8:
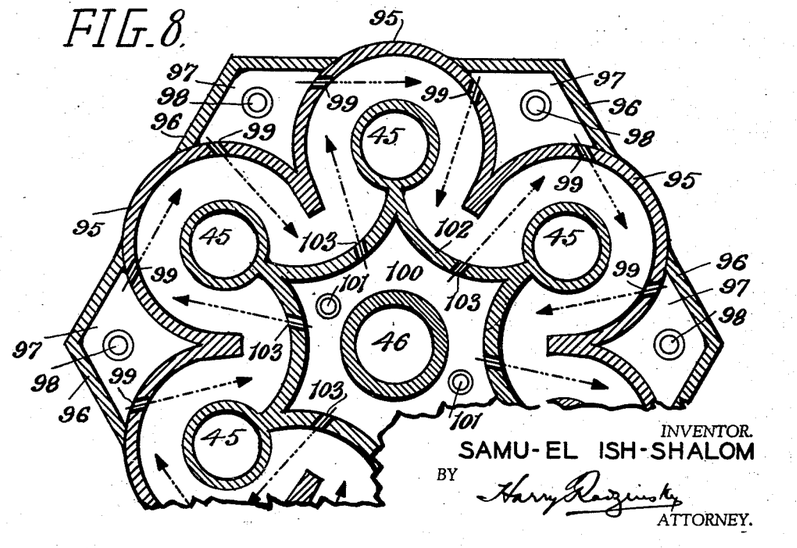

In Fig. 8 a mixing chamber of hexagonal form is shown, the same having a plurality of connected arcuate chambers formed by the walls 95. At the junction between each two chambers 95 is a wall 96 forming chamber 97 into which an air inlet 98 leads. Each of the arcuate chambers 95 has its wall formed with two angular air ports 99, one of said air ports in the wall of each chamber 95 communicating with the chamber 97 so that air entering through inlets 98 will pass through the ports 99 in the directions indicated by the arrows. At the central portion of the mixing chamber is provided a chamber 100 surrounded by the wall 102 and having the air inlets 101. Wall 102 is formed with the angular ports 103 through which air, entering chamber 100 through inlets 101 will pass. Again, the structure is such that the air admitted to the chamber will force the material being mixed through a tortuous path and thus insure complete mixture of the same. In the operation of this structure, air may first be admitted through inlets 98 and thereafter through inlets 101 and as such cycle is continued the materials are forwarded around the chamber in the tortuous path described, and clearly shown in Fig. 8. In the structures of Figs. 7 and 8 the inner wall is provided with tubular projections through which the material discharge openings 45 are provided.

Figure 11:
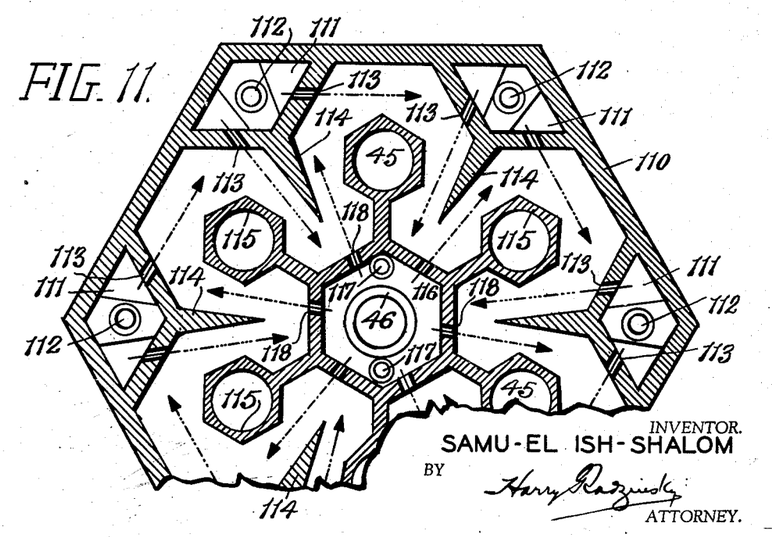

In Fig. 11 another form of hexagonal mixing chamber is shown, wherein 110 indicates the outer wall of the chamber, the same being formed on its inner side with spaced chambers 111, each of said chambers being provided with an air inlet 112 connected to a source of air under pressure. The inner walls of chamber 111 are formed with the angular ports 113 through which air delivered into chamber 111 may emanate to enter the mixing chamber. The inner walls of chambers 111 are formed with baffles 114 which co-operate with the hexagonal parts 115 extending from the walls of inner chamber 116, to provide a tortuous path through which the materials are carried in the mixing chamber. The walls of the inner chamber 116 are provided with the angular ports through which air under pressure, delivered through inlets 117 in chamber 116 is passed to enter into the mixing chamber. In this structure, air is first admitted through inlets 117 to pass out of ports 118; thereupon the air to inlets 117 is shut off and then air to inlets 112 is admitted to cause it to pass out of ports 113 and into the mixing chamber. The direction of air flow from the several groups of ports is shown in dotted arrows and it will be clear therefrom that the materials carried by the air streams will be conveyed through a tortuous path, impinged against the various wall surfaces of the chamber which define the path, and thoroughly mixed.

While I have shown the various air inlets or ports of the several mixing chambers described as being fixed openings formed in wall portions of the mixing chambers, means may be provided by which these inlets or ports may be adjusted and set at any selected angle, whereby the direction of air emanation from any one or more ports may be regulated. This is disclosed in Figs. 5 and 6 wherein 120 indicates the outer wall of a mixing chamber and 122 shows two adjustable nozzles which may be clamped in any selected position and at any desired position of adjustment by means of nut 123 and washer 124. Air feed pipe 125 is connected to the nozzle by means of a suitable coupling 126.

In describing the several embodiments of the mixing chamber shown in the drawings, I have indicated a definite sequence of operation of the two or three groups of air ports. I wish to be understood, however, as not limiting the invention to any specific sequence of operation of the several groups of ports, since the sequence of operation of the groups may be changed or reversed, as desired. In Fig. 14 is shown a chart graphically illustrating the valve operation when two groups of ports are to be operated successively, such as has been described with reference to the structures of Figs. 4, 8, 9 and 11. Specifically applying the chart to the structure of Fig. 4, it will be seen that in the upper figure of the chart the air under pressure is being delivered to the ports 35 while the supply to ports 39 is shut off. In the lower figure of the chart, the valve has been rotated so that the air supply to ports 35 is shut off while the passage to the ports 39 is opened.

Figure 17:
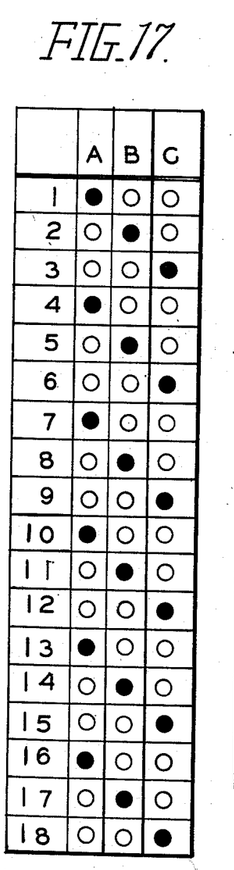
Fig. 17 is a chart indicating the manner in which the air valves operate according to chart of Fig. 15.

In the chart shown in Fig. 15 the operation of the air valves is disclosed when three groups of ports are employed in the mixing chamber, such as is shown, for example, in Fig. 7. There, in the upper figure the valve is shown admitting air under pressure to the inlets 91 while the passage of air to inlets 86 and 92 is shut off. In the center figure the valve is shown admitting air to the inlets 86 while the air to inlets 91 and 92 is shut off; in the lower figure the air is being admitted to inlets 92 while the supply to inlets 86 and 91 is shut off. It will be understood that the illustrations of the chart are diagrammatic only and instead of a single valve there shown, being employed for controlling the flow of air from one group of inlet openings to the next, a plurality of valves may be used. The manner in which the flow of air to three groups of air inlets may be controlled is further illustrated by the chart of Fig. 17, where the three groups of inlets are referred to by the letters A, B and C appearing at the head of the chart. In the first position, indicated at line 1 of the chart, the valves controlling the flow of air through inlets in the group A are opened, as indicated by the dot, while the valves in groups B and C are closed as indicated by the circles. In the second position, the valves in groups A and C are closed, while those in group B are opened. In the third position, those in group C are opened while those in groups A and B are closed. This is the complete cycle, which is repeated, as indicated in the chart.

Figure 16:
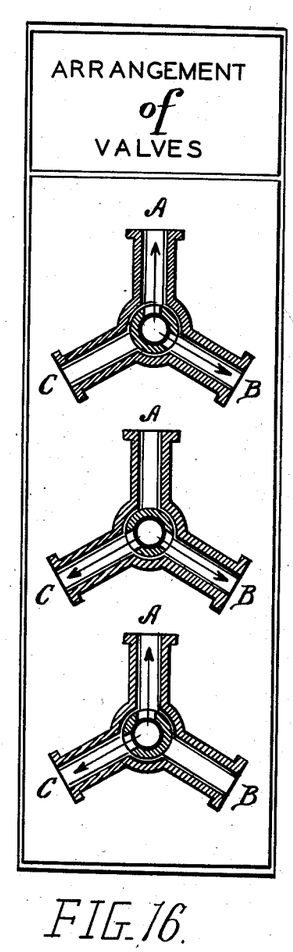
Fig. 16 is a similar chart, showing the manner in which three groups of air streams are employed and in which air is forced through two of said groups simultaneously.
Figure 18:
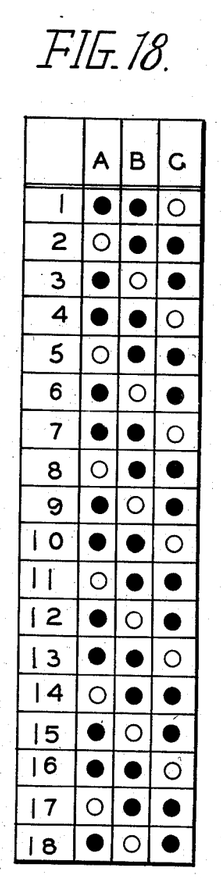
Fig. 18 is a chart showing the manner in which the valves operate according to the chart of Fig. 16.

While I have shown and described the employment of three successively-operating groups of air inlets, it is possible also to control the flow of air to said groups so that the passage of air through two of the groups may be had simultaneously while the supply to the third group is shut off. This is graphically illustrated in the chart shown in Fig. 16 and in that also shown in Fig. 18. In these two figures the three groups of inlets are indicated by the letters A, B and C. In the upper figure in Fig. 16, corresponding to line 1 in Fig. 18, air is shown as being admitted simultaneously to air inlet groups A and B while the supply to group C is shut off. In the central figure in Fig. 16 air is shown as being supplied to inlet groups B and C while the supply to group A is shut off (see line 2, Fig. 18). In the lower figure in Fig. 16 the air is being supplied to groups A and C while the supply to group B is shut off (see line 3, Fig. 18).

From the foregoing it will be seen that the air supply means and the sequence of operation of the valves controlling the air flow to the several groups of air inlets is very flexible in operation and may be easily controlled and operated according to the materials to be mixed and other factors. In Fig. 3 is shown the manner in which the numerous air valves and the material supply mechanism can be operated from a single power source. There, an electric motor is shown at 150, the shaft 151 thereof being connected to a gear-reducing mechanism 152 driving the shafts 153, 154 and 155. Shaft 153 carries beveled gear 156 which drives beveled gear 157 secured at the lower end of shaft 9 (Fig. 2) controlling the feed supply from hopper 14. Shaft 154 carries a gear 158 meshing with idle gear 159 which drives gear 160 secured on the shaft 161. A beveled gear 162, secured on shaft 161 drives beveled gear 163 secured on the vertical shaft 19 which controls the operation of the feed mechanism for hopper 17. A similar gear train from shaft 155, operates shaft 164 carrying the beveled gear 165 meshing with beveled gear 166 on the lower end of the vertical shaft 23 controlling the flow of material from the hopper 18. Shaft 154 operates a rotary valve 167 and also operates a valve 168 by means of the gears 169 and 170, the latter gear being secured upon shaft 171, said shaft constituting the stem of valve 168. Similarly, shaft 155 operates valve 172 and valve 173, the latter valve being rotated through gears 174 and 175, the gear 175 being secured on shaft 176 which constitutes the stem of the valve 173. Air is supplied for passage through the several valves 167, 168, 172 and 173 by means of the piping 177 extending from any suitable source of supply of air under pressure, and the outlets for each pair of valves are shown at 190, 191, 192 and 193. Four valves are shown, one of said valves being employed for the control of air flow to the material feed means so that materials from the three hoppers may be fed into the mixing chamber by air under pressure, while the three remaining valves are employed for the control of air flow to three groups of air inlets leading into the mixing chamber, the sequence of flow of the air to said groups of inlets being heretofore fully described. The flow of air to the material feeding means may be tapped from outlets 178 and 179 and connected therefrom to the pipes 36a and 40.

In the several embodiments of the invention herein described, I have shown two or more groups of air inlets leading into the tortuous passage formed within the mixing chamber. By the sequence of operation herein described, air is caused to flow successively through the groups whereby the streams of air emanating first from one group and then from the next, will forward the materials rapidly through the tortuous passage in the chamber. By the formation of such a tortuous passage in the chamber, the effective area within the chamber is greatly increased and the materials being rapidly moved through the interior of the air chamber are swirled through a long path and completely mixed.

What I claim is:

1. In a mixing machine, a mixing chamber having spaced walls defining a mixing passage between them, each of said walls being provided with spaced baffles, the baffles on one of the walls being disposed intermediate of those on the other wall whereby the passage formed between the walls is a tortuous one, each of said walls being provided with a plurality of air inlets communicating with the tortuous passage, means for delivering materials to be mixed into said passage, and means for automatically controlling the flow of air first to the inlets in one of the walls and then to the inlets in the second wall and automatically shutting off the flow of air to the inlets in one group when air is flowing through the inlets in the second group.

2. In a mixing machine, a mixing chamber provided with a tortuous passage through which materials to be mixed are moved by air under pressure, the mixing chamber having several groups of air inlets leading into said passage, means for automatically controlling the flow of air first through one group of air inlets and then through the next group in a continuous cycle, and means for delivering material to be mixed into the tortuous passage.

3. In a mixing machine, a mixing chamber having spaced inner and outer walls defining a mixing passage between them, projections on said walls extended into said passage to form said passage into a tortuous one, the outer wall being provided with a plurality of angular ports communicating with the tortuous passage, the inner wall being provided with a plurality of angular ports communicating with said passage, means for controlling the flow of air under pressure first through the ports in one of the walls and then through the ports in the second wall, and means for supplying materials to be mixed into the mixing passage.

4. In a mixing machine, a mixing chamber having spaced inner and outer walls defining a mixing passage between them, each of said walls being provided with a plurality of spaced baffle members entering into said passage, the baffle members on one of said walls being disposed between those on the other wall whereby the passage is formed into a tortuous one, each of the walls being provided between its baffle members with air inlets communicating with the tortuous passage, the inlets in each of the walls being directed toward the other wall, means for controlling the supply of air under pressure first to the inlets in one of the walls and then to the inlets in the other wall, and means for delivering materials to be mixed into the passage between the walls.

5. In a mixing machine, a mixing chamber having spaced walls defining a mixing passage between them, each of the walls being provided with spaced baffles, the baffles on one of the walls being disposed intermediate of those on the other wall whereby the passage formed between the walls is a tortuous one, each of the walls being provided with a plurality of air inlets communicating with the tortuous passage, the baffles being also provided with air inlets communicating with said passage, means for delivering materials to be mixed into said passage, and means for automatically controlling the flow of air to the inlets in one of the walls, and thereafter successively and automatically permitting the flow of air through the inlets in the other wall and baffles, and for automatically shutting off the flow of air through two groups of inlets while air is emanating from those of the other group.

6. In a mixing machine, a mixing chamber having inner and outer chambers, the outer chamber constituting a tortuous passage, the inner chamber having a wall formed with a plurality of spaced angular air ports, establishing communication between said inner chamber and the tortuous passage, means for conveying air under pressure into the inner chamber whereby the same may emanate through the ports leading therefrom to enter the tortuous passage, a second set of ports entering into said passage, means for conveying air under pressure to said second set of ports, and means for controlling the flow of air first through one set of ports and thereafter through the second set.

7. In a mixing machine, a mixing chamber provided with a continuous tortuous passage through which materials to be mixed are carried by air under pressure, air inlets entering into said passage at opposite sides of the same, means for supplying air under pressure to said inlets, and valve means for automatically controlling the flow of air first to some of said inlets and then to the rest of the same while the supply to the first inlets is automatically shut off.

8. In a mixing machine, a mixing chamber having inner and outer walls spaced to form a continuous mixing passage between them, each of said walls having projecting elements extending into said passage, the elements on one of the walls being disposed between those on the other walls whereby the passage formed between the walls and between said projecting elements is a tortuous one, the outer wall having a plurality of angularly disposed air inlets communicating at one end with the tortuous passage and at the other end with a source of air under pressure, the inner wall being also provided with a plurality of angular air inlets for supplying air under pressure into said passage, means for controlling the flow of air first through the inlets in one wall and then through the inlets in the second wall, and means for delivering materials to be mixed into the tortuous passage.

9. In a mixing machine, a mixing chamber provided with a continuous mixing passage in which materials are swirled by air pressure, means for delivering materials to be mixed into said chamber, material-swirling means including several groups of air ports communicating at one end with the passage and at the other end with a source of air under pressure, and means for automatically and selectively projecting air from the inlets in at least one group, while automatically shutting off the flow of air to the inlets in the remaining groups.

SAMU-EL ISH-SHALOM.